United States Patent
Schatzberger

(10) Patent No.: US 10,682,893 B2
(45) Date of Patent: Jun. 16, 2020

(54) SPRING- AND DAMPING ARRANGEMENT FOR A MOTORCYCLE

(71) Applicant: Bayerische Motoren Werke Aktiengesellschaft, Munich (DE)

(72) Inventor: Uwe Schatzberger, Buch (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/250,170

(22) Filed: Jan. 17, 2019

(65) Prior Publication Data

US 2019/0143781 A1   May 16, 2019

Related U.S. Application Data

(63) Continuation of application No. PCT/EP2017/064346, filed on Jun. 13, 2017.

(30) Foreign Application Priority Data

Jul. 22, 2016   (DE) .......................... 10 2016 213 429

(51) Int. Cl.
  *B60G 17/04*   (2006.01)
  *B60G 15/06*   (2006.01)
  (Continued)

(52) U.S. Cl.
  CPC .......... *B60G 17/0416* (2013.01); *B60G 11/56* (2013.01); *B60G 15/06* (2013.01);
  (Continued)

(58) Field of Classification Search
  CPC .... B60G 17/0416; B60G 11/56; B60G 15/06; B60G 17/0272; B60G 17/052; B62K 25/04; F16F 9/04; F16F 9/56; F16F 13/007
  (Continued)

(56) References Cited

U.S. PATENT DOCUMENTS

| 4,566,718 A | 1/1986 | Kanai et al. |
| 8,109,371 B2 * | 2/2012 | Kondo ................... B60G 11/15 188/266.3 |

(Continued)

FOREIGN PATENT DOCUMENTS

| DE | 33 43 007 C2 | 11/1991 |
| DE | 197 01 605 A1 | 7/1998 |

(Continued)

OTHER PUBLICATIONS

International Search Report (PCT/ISA/210) issued in PCT Application No. PCT/EP2017/064346 dated Aug. 10, 2017 with English translation (six (6) pages).

(Continued)

*Primary Examiner* — Jacob D Knutson
(74) *Attorney, Agent, or Firm* — Crowell & Moring LLP

(57) ABSTRACT

A spring and damping arrangement for adjusting the spring rate and the driving position of a motorcycle includes a series circuit having at least one helical spring, an air spring unit, and a hydraulic actuating element. The spring rate of the air spring unit is changeable as a function of a force acting from the outside on the spring and damping arrangement, such that the driving position change resulting from the applied force is compensated by the hydraulic loading of the hydraulic actuating element, such that a defined driving position can be adjusted or maintained.

19 Claims, 1 Drawing Sheet

(51) Int. Cl.
    B60G 17/027    (2006.01)
    F16F 13/00     (2006.01)
    F16F 9/56      (2006.01)
    B60G 11/56     (2006.01)
    F16F 9/04      (2006.01)
    B60G 17/052    (2006.01)
    B62J 99/00     (2020.01)
    B62K 25/04     (2006.01)
    B62J 50/20     (2020.01)

(52) U.S. Cl.
    CPC ....... *B60G 17/0272* (2013.01); *B60G 17/052* (2013.01); *B62J 99/00* (2013.01); *B62K 25/04* (2013.01); *F16F 9/04* (2013.01); *F16F 9/56* (2013.01); *F16F 13/007* (2013.01); *B60G 2202/12* (2013.01); *B60G 2202/152* (2013.01); *B60G 2202/32* (2013.01); *B60G 2202/413* (2013.01); *B60G 2300/12* (2013.01); *B60G 2400/51222* (2013.01); *B60G 2500/201* (2013.01); *B60G 2500/22* (2013.01); *B60G 2500/30* (2013.01); *B60G 2500/324* (2013.01); *B60G 2600/04* (2013.01); *B60G 2600/20* (2013.01); *B62J 50/20* (2020.02); *B62K 2025/044* (2013.01); *B62K 2025/045* (2013.01); *F16F 2228/066* (2013.01); *F16F 2230/183* (2013.01)

(58) Field of Classification Search
    USPC ........................................................ 180/227
    See application file for complete search history.

(56) References Cited

U.S. PATENT DOCUMENTS

2009/0134595 A1   5/2009   Haller et al.
2009/0302559 A1*  12/2009  Doerfel ................ B60G 15/065
                                                        280/5.519
2014/0197586 A1   7/2014   Wolf-Monheim
2014/0375002 A1*  12/2014  Coombs ............. B60G 17/0523
                                                        280/6.157
2018/0334212 A1*  11/2018  Bowers ..................... B62J 1/04

FOREIGN PATENT DOCUMENTS

| DE | 102 47 664 A1 | 4/2004 | |
| DE | 10247664 A1 * | 4/2004 | ........... B60G 17/052 |
| DE | 10 2004 032 083 A1 | 1/2006 | |
| DE | 102004032083 A1 * | 1/2006 | ......... B60G 17/0416 |
| DE | 10 2007 007 630 A1 | 8/2008 | |
| DE | 10 2007 015 888 A1 | 10/2008 | |
| DE | 10 2007 056 700 A1 | 6/2009 | |
| DE | 10 2009 045 051 A | 3/2011 | |
| DE | 102009045051 A1 * | 3/2011 | ......... B60G 17/0272 |
| DE | 10 2009 053 232 A1 | 5/2011 | |
| DE | 10 2014 200 118 A1 | 7/2014 | |
| EP | 0 444 278 A1 | 9/1991 | |
| EP | 1734277 A1 * | 12/2006 | ........... B60G 17/021 |
| EP | 1 734 277 B1 | 8/2010 | |
| JP | 59-79320 A | 5/1984 | |
| WO | WO 2014/057334 A1 | 4/2014 | |

OTHER PUBLICATIONS

German-language Written Opinion (PCT/ISA/237) issued in PCT Application No. PCT/EP2017/064346 dated Aug. 10, 2017 (six (6) pages).

German-language Search Report issued in counterpart German Application No. 10 2016 213 429.9 dated Mar. 28, 2017 with Partial English translation (12 pages).

* cited by examiner

SPRING- AND DAMPING ARRANGEMENT FOR A MOTORCYCLE

CROSS REFERENCE TO RELATED APPLICATIONS

This application is a continuation of PCT International Application No. PCT/EP2017/064346, filed Jun. 13, 2017, which claims priority under 35 U.S.C. § 119 from German Patent Application No. 10 2016 213 429.9, filed Jul. 22, 2016, the entire disclosures of which are herein expressly incorporated by reference.

BACKGROUND AND SUMMARY OF THE INVENTION

The invention relates to a spring and damping arrangement for setting the spring rate and the riding position of a motorcycle, and to a motorcycle which is equipped with an arrangement of this type.

Setting apparatuses for changing the suspension properties of the suspension system of a motorcycle are already known from the prior art in different embodiments. Here, for this purpose, setting apparatuses which are provided within the suspension system as a rule influence the damping properties of the damping element, in order to produce a soft, comfortable or hard, sporty damping action.

It is a disadvantage here that a ride level regulation means or a variably adjustable riding position within adjustable limits cannot be realized by way of the setting systems which act on the damper elements.

EP 1734277 B1 has disclosed a known system, what is known as the D-ESA system (Dynamic Electronic Suspension Adjustment). Here, the chassis can be set electronically via the suspension and damper properties. This takes place at the touch of a button by the operator, it being possible for the loading to be selected, that is to say whether one is riding alone, alone with luggage or, for example, with a pillion. The damping rate is changed by means of a proportional valve on the damper.

In the prior art, the spring rate adjustment is realized via the use of an elastomer ring. The latter is seated outside the coil spring and, in accordance with document DE 10 2009 053 232 A1, is connected mechanically in series. Here, an actuator which forms two fluid chambers which can be displaced on the circumferential face acts on the elastomer ring. Here, the degree of filling of the one chamber changes the spring preload, and the degree of filling of the other chamber controls the spring rate via the gap size change and therefore the available space of the elastomer ring.

DE 102007007630 A1 describes the above-described active mechanism, in a different structural implementation. Here, the change in the spring rate is produced via a spiral spring and an elastomer spring device which is connected in series. The device is composed of an elastomer element and an associated locking device. Here, a plurality of devices can be connected in series behind one another. Here, the locking device is to either lock or permit the compression of the elastomer element. The spring rate of the spring strut is therefore fixed by way of the spring rate of the spiral spring and the non-locked elastomer elements.

DE 10 2007 015 888 A1 has disclosed a further solution for setting the spring rate. Here, an additional spring which is connected in series with respect to the main spring is required. In addition, a slide is used which, when the predefined compression travel of the additional spring is reached, holds the stop of the additional spring and thus prevents further compression of the additional spring.

Documents EP 1734277 B1, DE 3343007 C2 and DE 10 2014 200 118 A1 have disclosed further solutions for setting the spring rate of a spring of a motorcycle.

The circumstance that the riding position cannot be set variably firstly in the case of a constant load and secondly in the case of a different load is a disadvantage in the case of the abovementioned solutions.

It is desirable to provide a solution, by way of which, in particular, the following states can be realized. In the case of constant loading, continuous lowering or raising of the riding position should be possible, with retention of the spring rate. The regulation of the riding position should therefore take place in a manner which is dependent on the loading. This should take place under the premise of not having to provide any additional assemblies or actuators as setting means. It is thus not desired, for example, to provide a compressor for generating compressed air in the motorcycle for space and weight reasons.

Proceeding from the prior art, it is therefore an object of the present invention to overcome the abovementioned disadvantages and to provide a universal, inexpensive solution for setting the spring rate and the riding position of a motorcycle.

Said object is achieved by way of an apparatus having the features of claim 1, and having the features of claim 6.

It is a core concept of the present invention to utilize the existing hydraulics, such as the oil hydraulics in a motorcycle, in such a way that a hydraulic actuator is arranged in series with and coupled in terms of pressure technology to an air spring and preferably a coil spring, by the air volume of the air spring being influenced by way of an increase in the loading, in such a way that firstly the spring characteristic, that is to say the spring rate changes, and secondly a desired riding level state results or can be set by way of adaptation using the hydraulic actuator in a manner which is dependent on the loading state.

Therefore, according to the invention, a spring and damping arrangement for setting the spring rate and the riding position of a motorcycle is proposed, comprising a series circuit comprising at least one coil spring, an air spring unit and a hydraulic actuator. The spring rate is therefore set in a manner which is dependent on the loading. The spring rate adjustment advantageously takes place in the form of an automatic adaptation in the case of a loading change.

The apparatus according to the invention advantageously has a means, by way of which the hydraulic loading of the hydraulic actuator can be changed manually or in accordance with the system setting, and the air volume of the air spring unit can be changed. Here, the hydraulic actuator can be configured as what is known as a preload adjuster. In the following text, a hydraulic actuator will be spoken of in general, a hydraulic unit which is variable with regard to the hydraulic loading preferably being used, which hydraulic unit can be filled with more or less hydraulic fluid, in order to change the effective spring strut length in a manner which is dependent on the spring rate in the case of a defined loading state.

Furthermore, it is provided in one preferred embodiment of the invention that a movable separating piston is arranged between the air spring unit and the hydraulic actuator, by way of the relative piston position of which separating piston the air volume of the air spring unit changes. Here, the hydraulic actuator can be loaded directly via a hydraulic line with the hydraulics and therefore the hydraulic fluid of the motorcycle. As an alternative, for example, a gas bag can also be provided as one realization form of the air spring. In simplified terms, these are multiple-layer high density plastic bags which are filled with gas. The hydraulics are supported against said bags.

According to the invention, it is possible as a result to realize the following conditions. If the hydraulic actuator is reset (relieved) in the case of a constant loading, the supporting preload of the spring forces which occur is shifted, as a result of which continuous lowering of the riding position is achieved, with retention of the spring rate. If the loading of the vehicle or motorcycle is increased, the hydraulic actuator has to be prestressed, that is to say has to be loaded hydraulically further, with the result that the spring rate rises and the desired riding position is maintained. If, in contrast, the loading is reduced, starting from a previously heavier loading, the hydraulic actuator has to be relieved, and the spring rate drops, as a result of which the desired riding position is maintained.

The spring rate of the air spring unit can be varied, for example, in the case of constant loading by way of a pressure adaptation by a connector stub, filling stub or service access of the air spring. A ride level regulating algorithm which is implemented correspondingly in the controller ensures via an electrified preload adjuster that the desired riding position is maintained in the case of a changed spring rate. The pressure of the air spring can be influenced, for example, via a mechanical or electric pump. In other words, this means that the air spring unit advantageously has a connector stub for air or another gaseous medium, in order to change the static filling pressure and therefore the spring rate of the air spring unit by way of adding or discharging of the air or the gaseous medium.

The spring and damping arrangement is advantageously configured in such a way that the hydraulic loading of the hydraulic actuator takes place using a mechanical or electromechanical setting apparatus.

A further aspect of the present invention relates to a motorcycle or engine-operated bicycle comprising a spring and damping arrangement as described above.

Furthermore, it is provided in one particularly advantageous embodiment of the invention that a ride level regulation means of the chassis which can be operated by a user is provided in the motorcycle, by way of which ride level regulation means the hydraulic loading of the hydraulic actuator and therefore the spring rate of the air spring unit can be set in a manner which is dependent on the loading state of the motorcycle, in such a way that the desired chassis level can be set.

In a further preferred embodiment of the invention, furthermore, the apparatus has a pressure sensor system and a pressure display which is connected to the pressure sensor system, by way of which pressure display the hydraulic loading and/or the pressure which is set in the air spring unit by way of the respective loading and dynamic riding situation of the motorcycle is displayed or can be displayed. Undesired chassis states can thus be reacted to directly. In the case, for example, of an excessively low air pressure in the air spring unit, the pressure can be increased using an on-board hand pump, and can be checked on the display.

In addition, it can also be provided that, furthermore, an electrically adjustable damper is provided in order to set the oscillation behavior of the spring and damping arrangement.

It is provided in one preferred embodiment of the method according to the invention that, furthermore, a stop or a rebound buffer spring is connected to the air spring unit, in order to limit the spring travels and/or the extension force of the air spring unit in the case of braking maneuvers, with the result that special riding situations can also be taken into account despite a riding position which can be set in a variable and comfortable manner.

Other objects, advantages and novel features of the present invention will become apparent from the following detailed description of one or more preferred embodiments when considered in conjunction with the accompanying drawings.

DETAILED DESCRIPTION OF THE DRAWINGS

The invention will be described in greater detail in the following paragraphs using example and diagrammatic embodiments with reference to FIGS. 1 and 2. Identical designations in the figures indicate identical and/or similar functional or structural features.

Figure 1:
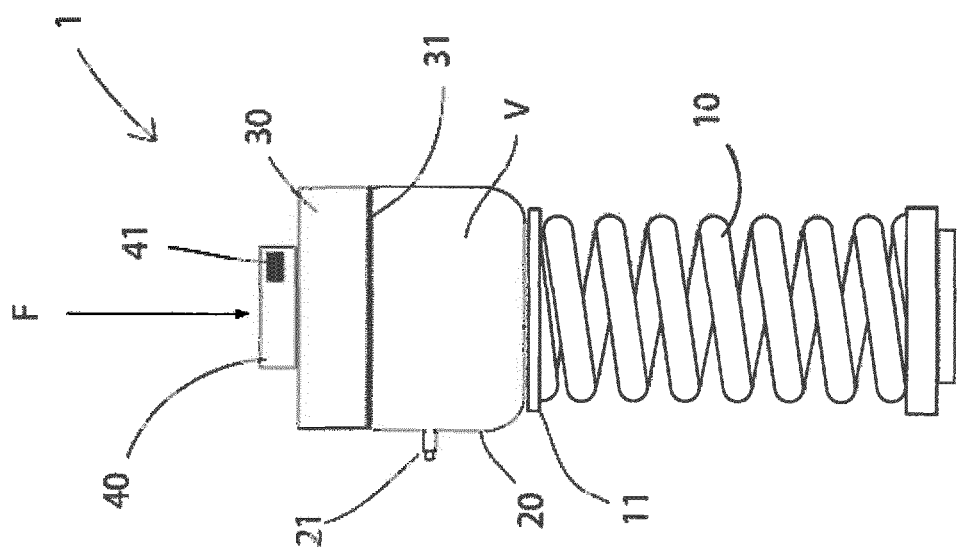
FIG. 1 shows a first embodiment of a spring and damping arrangement according to the invention for a motorcycle.

FIG. 1 shows a first embodiment of a spring and damping arrangement 1 for setting the spring rate and the riding position of a motorcycle, which includes a series circuit comprising a coil spring 10, an air spring unit 20 which is mechanically coupled directly to the coil spring 10, and a hydraulic actuator 30 which is configured as a hydraulic preload adjuster, is situated above the air spring and is not in direct contact with the steel spring.

The function of the hydraulic preload adjuster 30 lies in the targeted change of the effective spring arm length while the spring rate of the air spring unit 20 in the case of a changed loading changes in such a way that a defined riding position can be set in a manner which is dependent on a force F which acts as a result of the loading, for example as a result of the weight of the motorcycle and the loading which acts on the spring and damping arrangement 1.

If the volume of the air spring is changed via the hydraulic preload adjuster 30 by way of the application of pressure, its extension force will increase accordingly. In the case of constant loading, this would mean a loss of the riding position. The action of the preload adjuster 30 on the series circuit of the air and steel spring takes place temporally after the loading change. If the system is in a desired riding position for a defined loading state, the desired riding position is undershot in the case of an increase in the loading, as a result of the increased force on the series connection of the springs. Here, the external force acts on each individual spring of the series connection. For the air spring, this means a reduction its volume, which is linked to an increase in its spring rate. In order to re-establish the desired riding position, the preload adjuster 30 then has to be actuated in such a way that the original riding position is established again by way of the introduction of a hydraulic fluid, such as the hydraulic oil. A change in the spring rate does not occur, however, as a result of the action of the preload adjuster 30.

Figure 2:
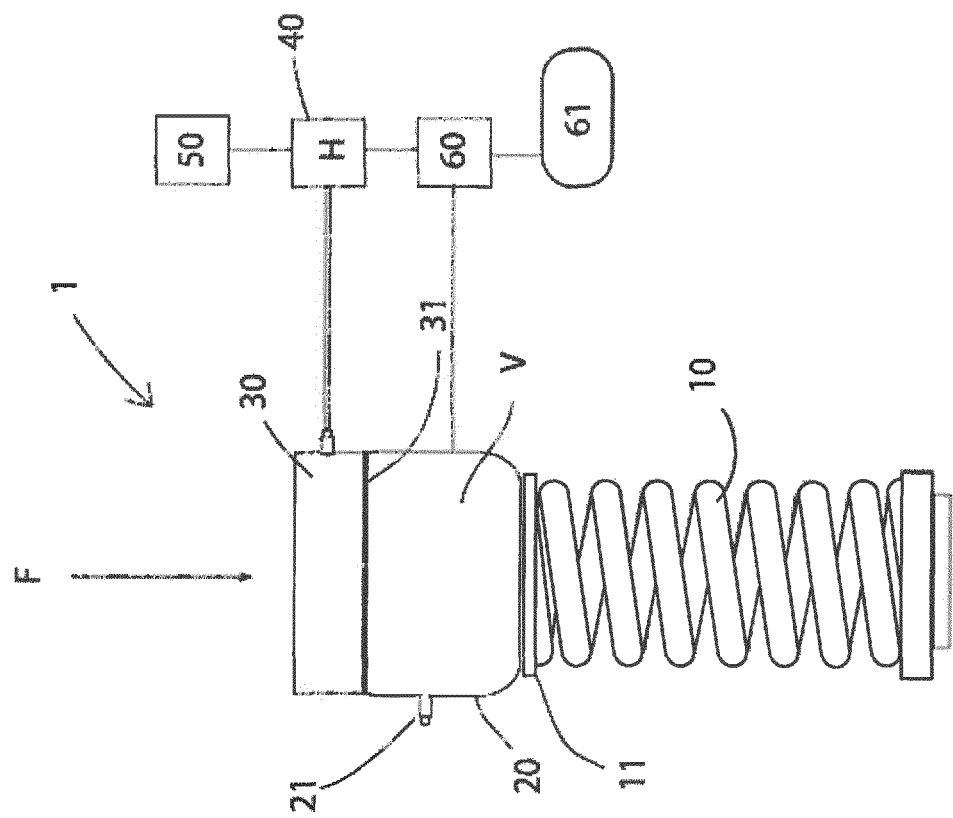
FIG. 2 shows a second embodiment of a spring and damping arrangement according to the invention for a motorcycle.

Furthermore, in each case one means 40 is provided in the two embodiments of FIGS. 1 and 2, by way of which means 40 the hydraulic loading of the hydraulic actuator 30 or the preload adjuster can be changed, as a result of which the air volume of the air spring unit 20 can be set, as described above. In the case of the embodiment in accordance with FIG. 1, said means is configured as an electromechanical setting apparatus 41, whereas, in the case of the embodiment in accordance with FIG. 2, a motorcycle-side hydraulic system is provided, by way of which the loading with hydraulic fluid in the preload adjuster 30 can be changed.

As a result, a movable separating piston 31 which is arranged between the air spring unit 20 and the hydraulic actuator can be actuated.

Furthermore, it can be seen in FIGS. 1 and 2 that the air spring unit 20 has a laterally accessible connector stub 21 for air or a gaseous medium, in order to change the static filling pressure and therefore the spring rate of the air spring unit 20 by way of adding or discharging of the air or the gaseous medium. Furthermore, said connector stub 21 can serve as a service access for maintenance work.

The coupling of the air spring unit 20 which can be configured as an air spring bellows or bladder is coupled mechanically to the coil spring 10 via a spring collar 11, with the result that a series connection of the springs is formed.

In a manner which is indicated merely diagrammatically, a ride level regulation means 50 for the chassis of a motorcycle is found in FIG. 2, by way of which ride level regulation means 50 the hydraulic loading of the hydraulic actuator 30 and the spring rate of the air spring unit 20 can be set in a manner which is dependent on the loading state of the motorcycle, that is to say on the force F which acts on the spring and damping arrangement 1, in such a way that a desired chassis level can be set.

A pressure sensor system 60 and a pressure display 61 which is connected to the pressure sensor system 60 are likewise shown diagrammatically, by way of which pressure display 61 the hydraulic loading and/or the pressure which is set in the air spring unit 20 as a result of the respective loading and dynamic riding situation of the motorcycle is displayed or can be displayed.

The realization of the invention is not restricted to the above-specified preferred exemplary embodiments. Rather, a number of variants are conceivable which make use of the described solution even in the case of embodiments of a fundamentally different type. The arrangement according to the invention can thus be mounted on the front fork of a motorcycle or powered cycle, or the front wheel steering system of a motorcycle can be equipped with it, in order to achieve the abovementioned advantages in a motorcycle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spring and damping arrangement for setting a spring rate and a riding position of a motorcycle, comprising:
   at least one coil spring;
   an air spring unit; and
   a hydraulic actuator,
   wherein
      the at least one coil spring, the air spring unit and the hydraulic actuator are arranged in a serial connection with the at least one coil spring at a first end of the serial connection,
      a spring rate of the air spring unit is changeable based on a force which acts on the spring and damping arrangement,
      the hydraulic actuator is configured to compensate a riding position change resulting from a change in the spring rate of the air spring unit by changing a hydraulic loading of the hydraulic actuator, such that the riding position is maintained or changed to a predetermined riding position.

2. The spring and damping arrangement as claimed in claim 1, wherein
   the hydraulic actuator includes a hydraulic loading changing device.

3. The spring and damping arrangement as claimed in claim 2, wherein
   the hydraulic loading hydraulic loading changing device is a mechanical or electromechanical setting apparatus.

4. The spring and damping arrangement as claimed in claim 3, further comprising:
   a movable separating piston arranged between the air spring unit and the hydraulic actuator, the movable separating piston being configured to set an air volume of the air spring unit.

5. The spring and damping arrangement as claimed in claim 4, wherein
   the air spring unit includes a connector stub configured for passage of air or a non-air gaseous medium capable of changing the spring rate of the air spring unit by changing a filling pressure of the air spring unit.

6. A motorcycle or engine-operated bicycle comprising:
   a spring and damping arrangement as claimed in claim 5.

7. The motorcycle or engine-operated bicycle as claimed in claim 6, further comprising:
   a user-operable ride level regulator of a chassis, the ride level regulator being configured to change the hydraulic loading of the of the hydraulic actuator to maintain or to change to the predetermined riding position based on one or more of a loading state of the motorcycle and a dynamic driving situation of the motorcycle.

8. The motorcycle or engine-operated bicycle as claimed in claim 7, further comprising:
   a pressure sensor system; and
   a pressure display,
   wherein
      the pressure display is connected to the pressure sensor system such that the pressure display is capable of displaying one or more of the hydraulic loading and the filling pressure in the air spring unit.

9. The motorcycle or engine-operated bicycle as claimed in claim 8, further comprising:
   an electrically adjustable damper configured to set an oscillation behavior of the spring and damping arrangement.

10. The motorcycle or engine-operated bicycle as claimed in claim 9, further comprising:
    a stop or a rebound buffer spring connected to the air spring unit, the stop or rebound spring being configured to limit one or more of spring travel and extension force of the air spring unit during braking.

11. The motorcycle or engine-operated bicycle as claimed in claim 8, further comprising:
    a stop or a rebound buffer spring connected to the air spring unit, the stop or rebound spring being configured to limit one or more of spring travel and extension force of the air spring unit during braking.

12. The motorcycle or engine-operated bicycle as claimed in claim 7, further comprising:
    an electrically adjustable damper configured to set an oscillation behavior of the spring and damping arrangement.

13. The motorcycle or engine-operated bicycle as claimed in claim 12, further comprising:

a stop or a rebound buffer spring connected to the air spring unit, the stop or rebound spring being configured to limit one or more of spring travel and extension force of the air spring unit during braking.

14. The motorcycle or engine-operated bicycle as claimed in claim 7, further comprising:
a stop or a rebound buffer spring connected to the air spring unit, the stop or rebound spring being configured to limit one or more of spring travel and extension force of the air spring unit during braking.

15. The motorcycle or engine-operated bicycle as claimed in claim 6, further comprising:
a pressure sensor system; and
a pressure display,
wherein
the pressure display is connected to the pressure sensor system such that the pressure display is capable of displaying one or more of the hydraulic loading and the filling pressure in the air spring unit.

16. The motorcycle or engine-operated bicycle as claimed in claim 15, further comprising:
an electrically adjustable damper configured to set an oscillation behavior of the spring and damping arrangement.

17. The motorcycle or engine-operated bicycle as claimed in claim 16, further comprising:
a stop or a rebound buffer spring connected to the air spring unit, the stop or rebound spring being configured to limit one or more of spring travel and extension force of the air spring unit during braking.

18. The motorcycle or engine-operated bicycle as claimed in claim 15, further comprising:
a stop or a rebound buffer spring connected to the air spring unit, the stop or rebound spring being configured to limit one or more of spring travel and extension force of the air spring unit during braking.

19. The motorcycle or engine-operated bicycle as claimed in claim 6, further comprising:
a stop or a rebound buffer spring connected to the air spring unit, the stop or rebound spring being configured to limit one or more of spring travel and extension force of the air spring unit during braking.

* * * * *